(12) United States Patent
Chen et al.

(10) Patent No.: US 10,688,771 B2
(45) Date of Patent: Jun. 23, 2020

(54) 3D PRINTING WITH VARIABLE VOXEL SIZES BASED ON OPTICAL FILTER

(71) Applicant: University of Southern California, Los Angeles, CA (US)

(72) Inventors: Yong Chen, Los Angeles, CA (US); Yuanrui Li, Los Angeles, CA (US); Huachao Mao, Los Angeles, CA (US); Wei Wu, Los Angeles, CA (US)

(73) Assignee: University of Southern California, Los Angeles, CA (US)

( * ) Notice: Subject to any disclaimer, the term of this patent is extended or adjusted under 35 U.S.C. 154(b) by 269 days.

(21) Appl. No.: 15/498,381

(22) Filed: Apr. 26, 2017

(65) Prior Publication Data

US 2017/0307902 A1 Oct. 26, 2017

Related U.S. Application Data

(60) Provisional application No. 62/327,699, filed on Apr. 26, 2016.

(51) Int. Cl.
| | |
|---|---|
| *G02B 27/42* | (2006.01) |
| *G02B 27/09* | (2006.01) |
| *G02B 26/10* | (2006.01) |
| *B33Y 10/00* | (2015.01) |
| *B33Y 30/00* | (2015.01) |
| *B29C 67/00* | (2017.01) |
| *B29C 64/277* | (2017.01) |
| *B29C 64/135* | (2017.01) |

(Continued)

(52) U.S. Cl.
CPC ............ *B33Y 30/00* (2014.12); *B29C 64/135* (2017.08); *B29C 64/277* (2017.08); *B29C 64/386* (2017.08); *B33Y 10/00* (2014.12);
*G02B 27/0988* (2013.01); *G02B 5/005* (2013.01); *G02B 5/22* (2013.01); *G02B 26/101* (2013.01)

(58) Field of Classification Search
CPC .................................................. G02B 26/101; G02B 26/0808; B29C 64/124; B29C 64/129; B29C 64/135; B29C 64/268; B29C 64/277; B29C 64/286
See application file for complete search history.

(56) References Cited

U.S. PATENT DOCUMENTS

| | | | |
|---|---|---|---|
| 4,575,330 A | 3/1986 | Hull | |
| 6,730,256 B1 * | 5/2004 | Bloomstein | ............. B29C 64/40 264/401 |

(Continued)

OTHER PUBLICATIONS

Carletti et al., "High-index-contrast grating reflector with beam steering ability for the transmitted beam," Opt. Express 19, 23567 (2011).

(Continued)

*Primary Examiner* — Jason L Lazorcik
(74) *Attorney, Agent, or Firm* — Michael Best & Friedrich LLP

(57) ABSTRACT

A three-dimensional printing approach based on stereolithography with variable printing resolutions to solve the trade-off between throughput and resolution. In this technology, the variable fabrication resolutions are achieved by switching light wavelength. The apparatus includes an optical filter based on high-contrast gratings. In one embodiment, the minimum printing resolution of the accordingly constructed stereolithography apparatus is reduced to 37 μm.

20 Claims, 12 Drawing Sheets

(51) Int. Cl.
*B29C 64/386* (2017.01)
*G02B 5/00* (2006.01)
*G02B 5/22* (2006.01)

(56) References Cited

U.S. PATENT DOCUMENTS

| | | | |
|---|---|---|---|
| 6,777,170 B1 * | 8/2004 | Bloomstein | G03F 7/0037 264/401 |
| 6,833,234 B1 * | 12/2004 | Bloomstein | B29C 64/40 264/401 |
| 7,692,411 B2 | 4/2010 | Trainor et al. | |
| 2009/0083556 A1 | 3/2009 | Zimek et al. | |
| 2018/0345580 A1 * | 12/2018 | Chen | B29C 64/268 |

OTHER PUBLICATIONS

Chang-Hasnain et al., "High-contrast gratings for integrated optoelectronics," Adv. Opt. Photonics 4, 379 (2012).
Chang-Hasnain, "High-contrast gratings as a new platform for integrated optoelectronics," Semicond. Sci. Technol. 26, 014043 (2011).
Fattal et al., "Flat dielectric grating reflectors with focusing abilities," Nat. Photonics 4, 466 (2010).
Guo et al., "Additive manufacturing: Technology, applications and research needs," Front. Mech. Eng. 8, 215 (2013).
Huang et al., "A surface-emitting laser incorporating a high-index-contrast subwavelength grating," Nat. Photonics 1, 119 (2007).
Ikeda et al., "Polarization-independent high-index contrast grating and its fabrication tolerances," Appl. Opt. 52, 1049 (2013).
Karagodsky et al., "Physics of near-wavelength high contrast gratings," Opt. Express 20, 10888 (2012).
Karagodsky et al., "Theoretical analysis of subwavelength high contrast grating reflectors," Opt. Express 18, 16973 (2010).
Lu et al., "Planar high-numerical-aperture low-loss focusing reflectors and lenses using subwavelength high contrast gratings," Opt. Express 18, 12606 (2010).
Mateus et al., "Ultrabroadband mirror using low-index cladded subwavelength grating," IEEE Photonics Technol. Lett. 16, 518 (2004).
Miller et al., "Variable beam size SLS workstation and enhanced SLS model," Rapid Prototyping J. 3, 4 (1997).
Nakayama et al., "Electron-beam cell projection lithography: A new high-throughput electron-beam direct-writing technology using a specially tailored Si aperture," J. Vac. Sci. Technol. B 8, 1836 (1990).
Shokooh-Saremi, "Wideband leaky-mode resonance reflectors: Influence of grating profile and sublayers," Opt. Express 16, 18249 (2008).
Sim et al., "Effect of the Laser Beam Size on the Cure Properties of a Photopolymer in Stereolithography," Int. J. Precis. Eng. Manuf. 8, 50 (2007) available at http://www.dbpia.co.kr/Journal/ArticleDetail/NODE00884629.
Wong et al., "A Review of Additive Manufacturing," ISRN Mech. Eng. 2012, 208760.
Yan et al., "A review of rapid prototyping technologies and systems," Gu, Comput. Aided Des. 28, 307 (1996).
Yang et al., "Physics of high contrast gratings: a band diagram insight," Proc. SPIE 8633, 863303 (2013).
Yao et al., "Fabrication of high-contrast gratings for a parallel spectrum splitting dispersive element in a concentrated photovoltaic system," J. Vac. Sci. Technol. B 32, 06FG04 (2014).
Yao et al., "Spectrum splitting using multi-layer dielectric metasurfaces for efficient solar energy harvesting," Appl. Phys. A 115, 713 (2014).
Cao et al., Using variable beam spot scanning to improve the efficiency of stereolithography processRapid Prototyping J. 19, 100 (2013).

* cited by examiner

Table 1. Calculated distances of travel of the beam spots for building the microfluidic device in Fig. 10. The distances are calculated for using small beam spot only and using small and large beam spots together.

| Small beam spot only | Small and large beam spot | | | $\dfrac{d_{small\ only}}{d_{small}+d_{large}}$ | Time saved (%) |
|---|---|---|---|---|---|
| $d_{small\ only}$ (mm) | $d_{small}$ (mm) | $d_{large}$ (mm) | $d_{small}+d_{large}$ (mm) | | |
| 473961 | 12706 | 45808 | 58514 | 8.10 | 87.6 |

FIG. 11

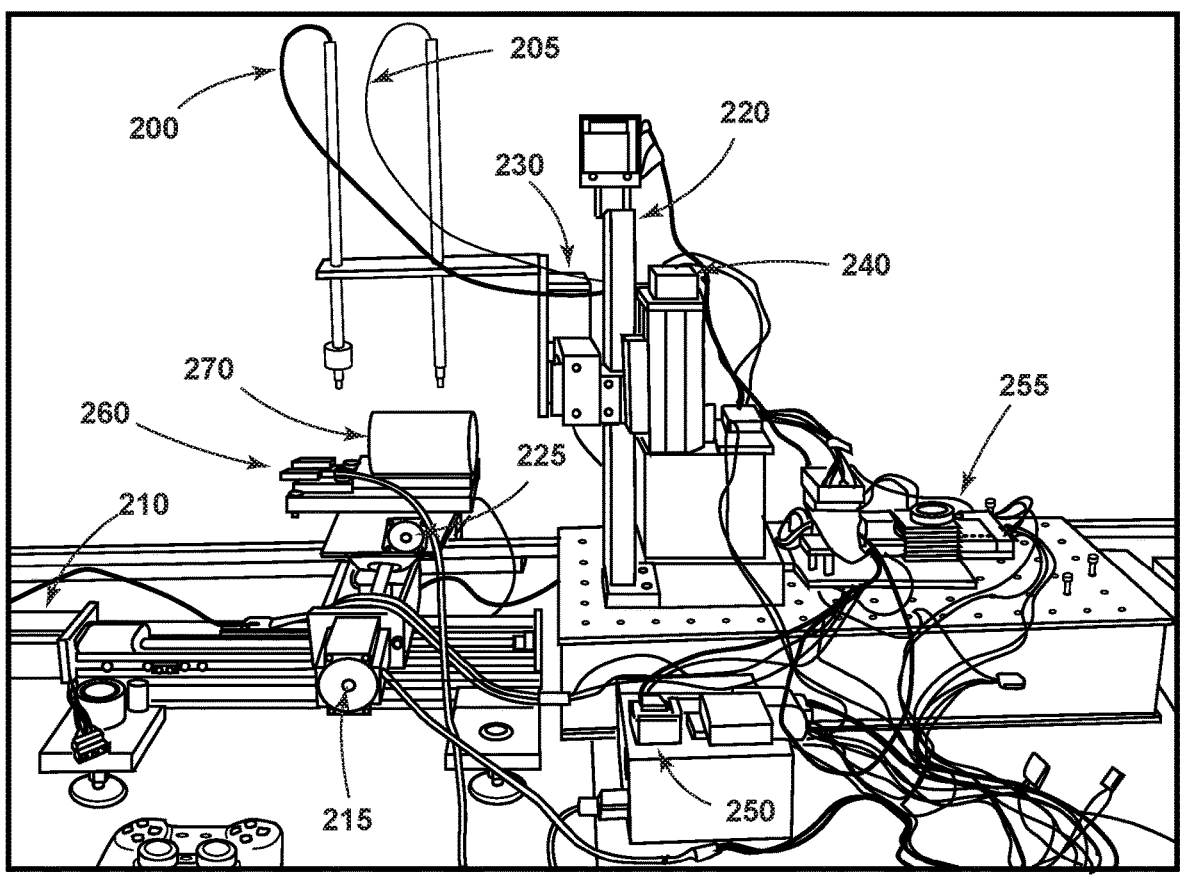

FIG. 12

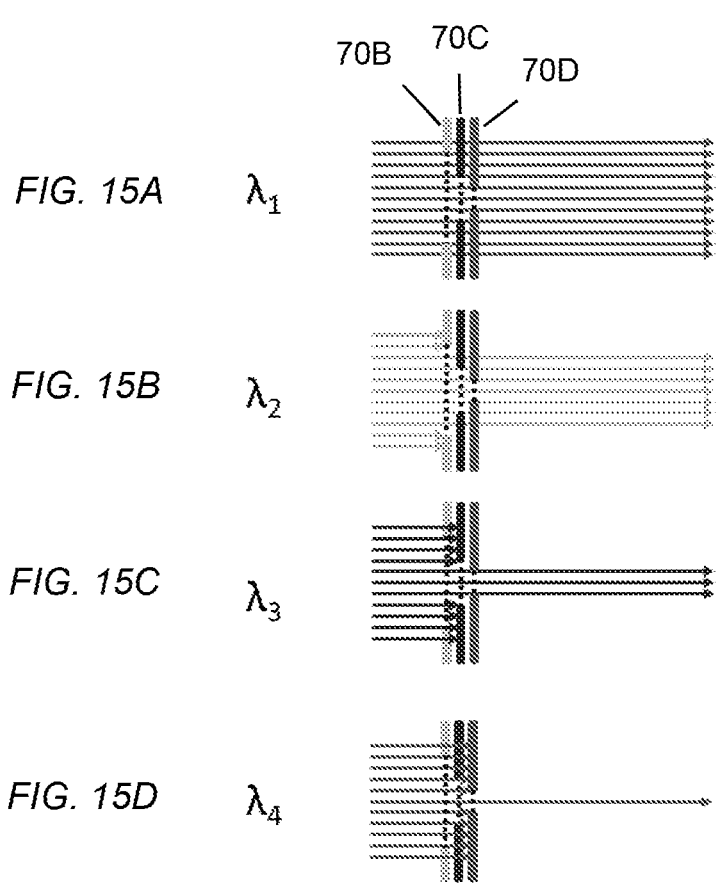

3D PRINTING WITH VARIABLE VOXEL SIZES BASED ON OPTICAL FILTER

RELATED APPLICATION

This application claims the benefit of U.S. Patent Application No. 62/327,699; entitled "3D PRINTING WITH VARIABLE VOXEL SIZE BASED ON OPTICAL FILTER;" filed on Apr. 26, 2016; the content of which is incorporated herein by reference.

BACKGROUND

The invention relates to a stereolithography apparatus and method of controlling light in a stereolithography apparatus.

The following references may be referred to in this disclosure and are incorporated herein by reference.

- X. Yan and P. Gu, Comput. Aided Des. 28, 307 (1996).
- N. Guo and M. C. Leu, Front. Mech. Eng. 8, 215 (2013).
- K. V. Wong and A. Hernandez, ISRN Mech. Eng. 2012, 208760.
- C. W. Hull, U.S. Pat. No. 4,575,330 (11 Mar. 1986).
- Y. Cao, D. Li, and J. Wu, Rapid Prototyping J. 19, 100 (2013).
- D. Miller, C. Deckard, and J. Williams, Rapid Prototyping J. 3, 4 (1997).
- J. H. Sim, E. D. Lee, and H. J. Kweon, Int. J. Precis. Eng. Manuf 8, 50 (2007) available at http://www.dbpia.co.kr/Journal/ArticleDetail/NODE00884629.
- Y. Nakayama, S. Okazaki, N. Saitou, and H. Wakabayashi, J. Vac. Sci. Technol. B 8, 1836 (1990).
- C. J. Chang-Hasnain and W. Yang, Adv. Opt. Photonics 4, 379 (2012).
- M. C. Y. Huang, Y. Zhou, and C. J. Chang-Hasnain, Nat. Photonics 1, 119 (2007).
- V. Karagodsky and F. G. Sedgwick, Opt. Express 18, 16973 (2010).
- V. Karagodsky and C. J. Chang-Hasnain, Opt. Express 20, 10888 (2012).
- C. J. Chang-Hasnain, Semicond. Sci. Technol. 26, 014043 (2011).
- F. Lu, F. G. Sedgwick, V. Karagodsky, C. Chase, and C. J. Chang-Hasnain, Opt. Express 18, 12606 (2010).
- C. F. R. Mateus, M. C. Y. Huang, Y. Deng, A. R. Neureuther, and C. J. Chang-Hasnain, IEEE Photonics Technol. Lett. 16, 518 (2004).
- K. Ikeda, K. Takeuchi, K. Takayose, I.-S. Chung, J. Mork, and H. Kawaguchi, Appl. Opt. 52, 1049 (2013); L. Carletti, R. Malureanu, J. Mork, and I.-S. Chung, Opt. Express 19, 23567 (2011).
- D. Fatal, J. Li, Z. Peng, M. Fiorentino, and R. G. Beausoleil, Nat. Photonics 4, 466 (2010).
- Y. Yao, H. Liu, and W. Wu, Appl. Phys. A 115, 713 (2014).
- Y. Yao, H. Liu, and W. Wu, J. Vac. Sci. Technol. B 32, 06FG04 (2014).
- H. Liu, Y. Yao, Y. Wang, and W. Wu, J. Vac. Sci. Technol. B 32, 06FE04 (2014).
- M. Shokooh-Saremi, Opt. Express 16, 18249 (2008).
- W. Yang and C. J. Chang-Hasnain, Proc. SPIE 8633, 863303 (2013).

Additive manufacturing (AM), commonly known as three-dimensional (3D) printing, has been a fast developing area for more than three decades. It is a process that uses information from a computer-aided design file to build a 3D physical object. It has significant advantages over traditional manufacturing methods in (1) rapid creation of 3D prototypes, and (2) cost-effective production of patterns and molds with complex surfaces. Many materials have already been used in additive manufacturing such as polymer, metal, and ceramic. There are several technologies that have been developed for additive manufacturing, including stereolithography, binder printing (3DP), fused deposition modeling, selective laser sintering (SLS), etc. Among these technologies, stereolithography is the first commercially available prototyping machine and one of the most widely used AM processes.

The production efficiency of stereolithography is determined by many factors, such as light spot diameter, scanning speed, hatch space, and curing depth. Among them, light spot diameter is the most direct way to determine the production efficiency.

The diameter of the light spot is determined by the entire optical system and could be difficult to control precisely. Therefore, most stereolithography systems set the spot diameter as a constant. The specific value is a tradeoff between the size of the part that is being built and the desired resolution, which is typically about 0.1%-0.5% of the overall dimension. For this reason, a variable beam spot that can improve production efficiency while keeping high resolution is a promising direction for stereolithography. With a variable beam spot, a large spot can fill an open area quickly and a small spot can build details that require high resolution. Many studies have been carried out on methods to change spot size. Miller et al. developed a SLS workstation that has two laser spot sizes by pulling an aperture into and out of light path. Sim et al. used lenses with different focal length to produce different laser spot sizes. Cao et al. reported a stereolithography process that uses a dynamic focusing mirror to change spot size. Several specimens demonstrated more than 25% building time saving.

Most of the studies involved the dynamic motion of optical components such as lens or physical aperture. Hence, cost of the systems would be increased due to the requirement of precise control of the motion during the fabrication process.

SUMMARY

This disclosure includes a new method of changing light beam spot size by using two laser wavelengths and an optical filter based on high-contrast grating structure. For one of the wavelengths, the filter is almost transparent, which gives a larger spot size, while for the other wavelength, the filter works as an aperture and only part of the area is transparent, which gives a much smaller beam spot size. The advantages of this method over the previous approaches are: (1) the filter could significantly reduce the spot size of the laser beam that has been focused by lens; (2) as long as the optical system is well adjusted initially, no precise adjustment is needed during the fabrication process; (3) only an optical switch that can switch between the two wavelengths is needed during the continuous manufacturing process; (4) wavelength switching is faster than other spot size adjustment methods; (5) the shape of beam cross-section can be modified into any geometry in a fashion similar to the shaped-beam electron-beam lithography.

Other aspects of the invention will become apparent by consideration of the detailed description and accompanying drawings.

BRIEF DESCRIPTION OF THE DRAWINGS

FIG. 11 provides a table of calculated distance of travel of the beam spots for building the microfluidic device in FIG. 10.

FIG. 12 is a side view of a CNC accumulation apparatus.

FIGS. 15A-15D depict multiple transmission modes of an a plurality of optical filters.

DETAILED DESCRIPTION OF THE INVENTION

Figure 1:
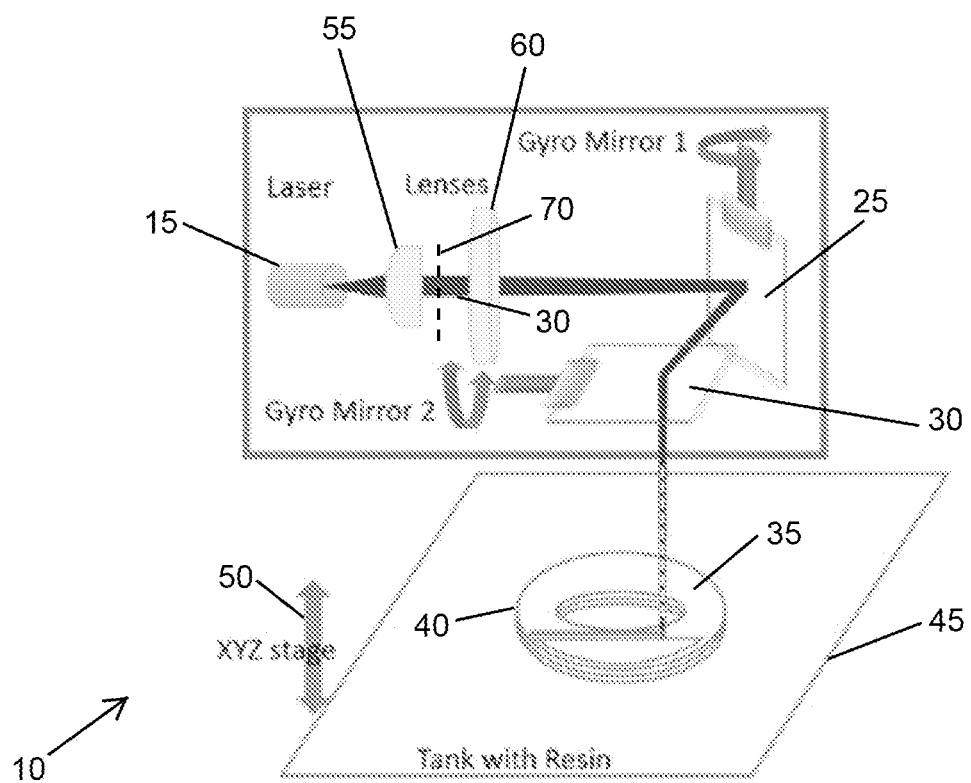
FIG. 1 is a schematic of a stereolithography apparatus.

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless specified or limited otherwise, the terms "mounted," "connected," "supported," and "coupled" and variations thereof are used broadly and encompass both direct and indirect mountings, connections, supports, and couplings. Further, "connected" and "coupled" are not restricted to physical or mechanical connections or couplings.

Additionally, the functionality described herein as being performed by one component may be performed by multiple components in a distributed manner. Likewise, functionality performed by multiple components may be consolidated and performed by a single component. Similarly, a component described as performing particular functionality may also perform additional functionality not described herein. For example, a device or structure that is "configured" in a certain way is configured in at least that way, but may also be configured in ways that are not listed. Furthermore, some embodiments described herein may include one or more electronic processors configured to perform the described functionality by executing instructions stored in non-transitory, computer-readable medium. Similarly, embodiments described herein may be implemented as non-transitory, computer-readable medium storing instructions executable by one or more electronic processors to perform the described functionality. Described functionality can be performed in a client-server environment, a cloud computing environment, a local-processing environment, or a combination thereof.

Stereolithography Setup

The stereolithography process uses photocurable resin, which consists of monomers that can be polymerized into large molecules. In the apparatus 10 of FIG. 1, a laser source 15 creates a laser beam 20 that is deflected by two gyromirrors 25 and 30. Next, the laser beam 20 is projected on the surface 35 of a resin 40 in a liquid tank 45 and traces a cross-section of the object that is being printed. A Z stage 50 stays below the liquid resin surface at a depth that is smaller than the light curing depth. After a layer has been cured, the Z stage 50 moves down a distance of the thickness of a layer. Other stereolithography systems may operate differently from the apparatus 10 discussed herein.

Figure 2:
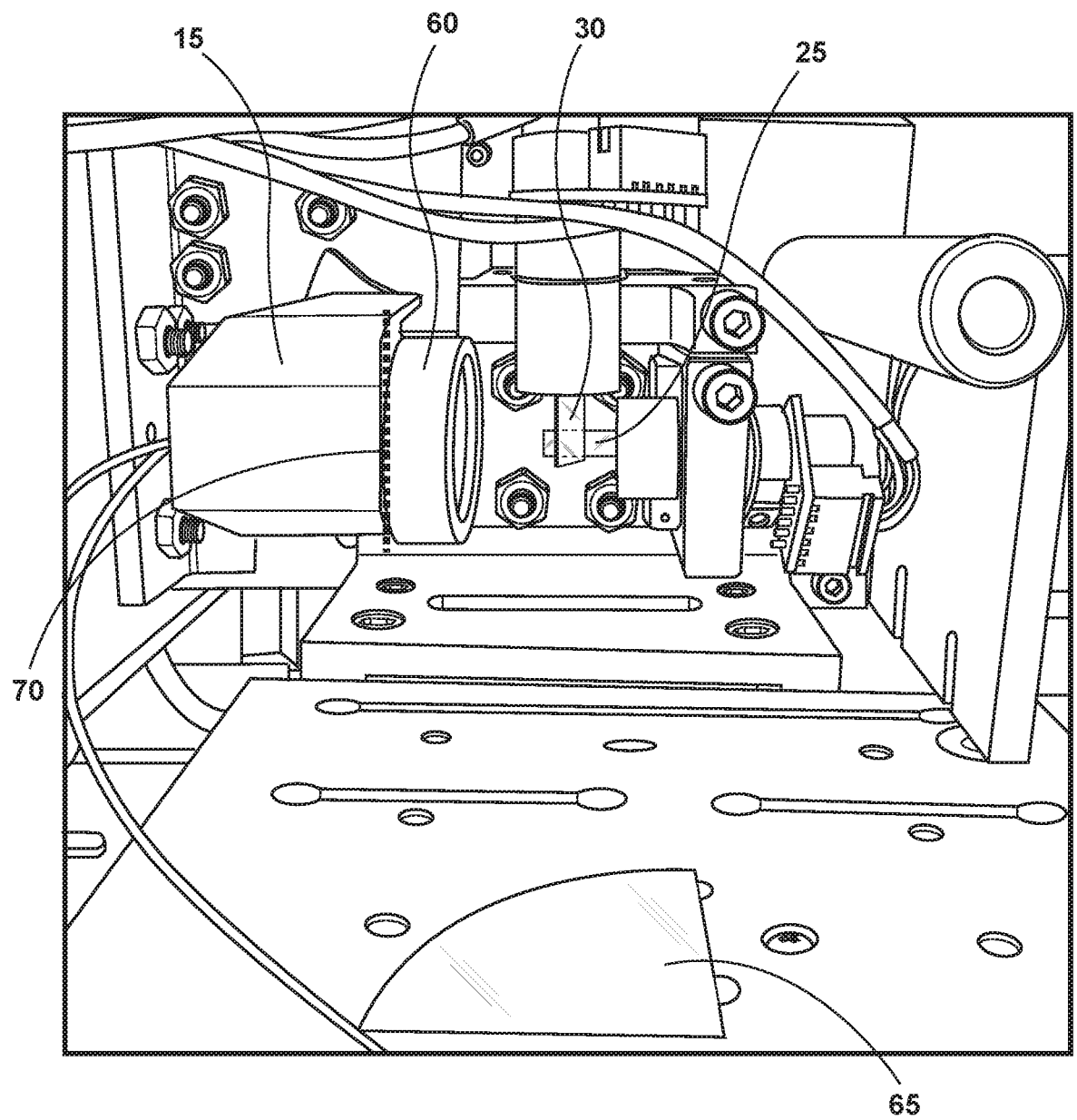
FIG. 2 is a side view of the stereolithography apparatus of FIG. 1.

FIG. 2 shows the stereolithography setup used according to the schematic of FIG. 1. A light beam 20 was created by a collimated laser source 15, including collimated lens 55 (FIG. 1). Lasers with 405 and 445 nm wavelength were used in the experiment. Other wavelengths are envisioned for the system of FIG. 2. The beam 20 was then focused by the focusing lens 60. Next, the beam was deflected by the Y mirror and X mirror 25 and 30, respectively, to scan on the resin surface 35. The testing target 65 was a silicon wafer coated with photocurable resin. A filter 70 was installed next to the focusing lens.

FIG. 12 shows a computer numerical control (CNC) accumulation tool. The following reference nos. relate to the figure: 200—optical fiber no. 1; 205—optical fiber no. 2; 210—X Axis; 215—Y Axis; 220—Z Axis; 225—C Axis, 230—A Axis; 235—LED no. 1; 240—LED no. 2; 255—motion controller; 260—force sensor; 270—resin tank.

Optical Filter Design and Fabrication

Figure 3A:
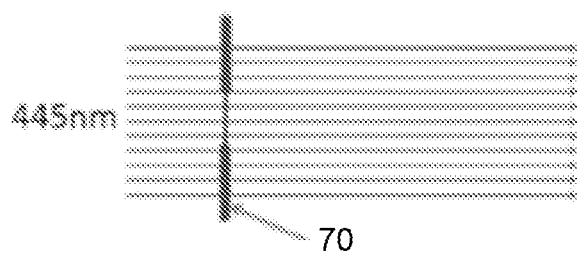
FIGS. 3A and 3B depict two transmission modes of the optical filter.
Figure 3B:
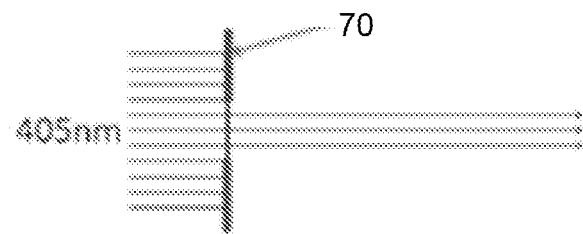
Figure 13A:
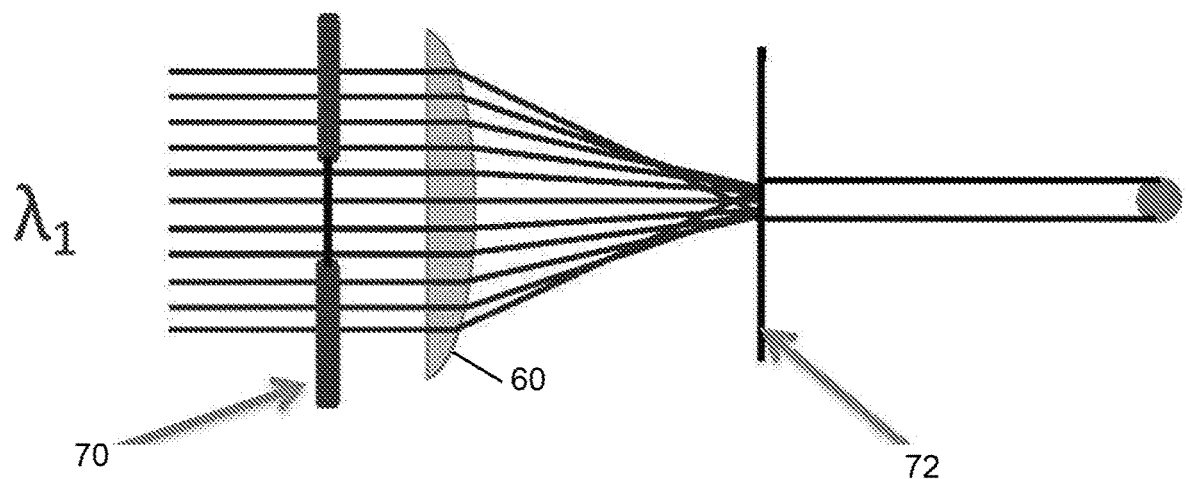
FIGS. 13A and 13B depict two transmission modes of an optical filter with a focusing lens.
Figure 13B:
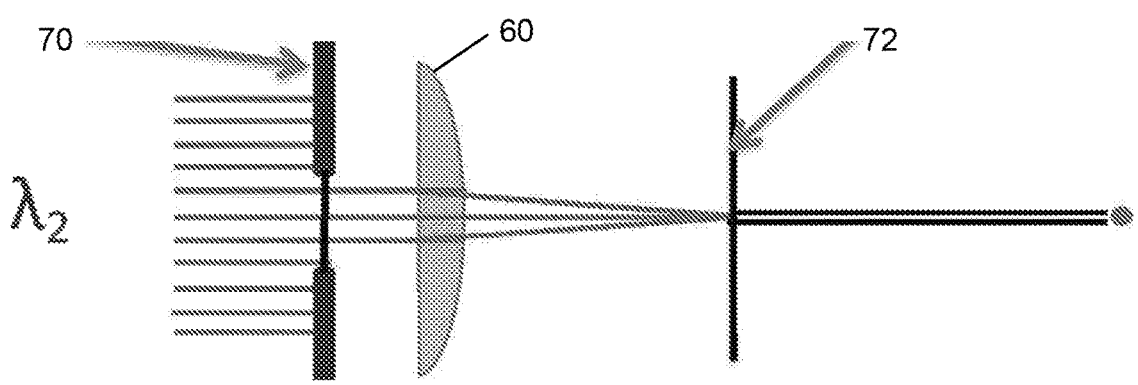
Figure 14A:
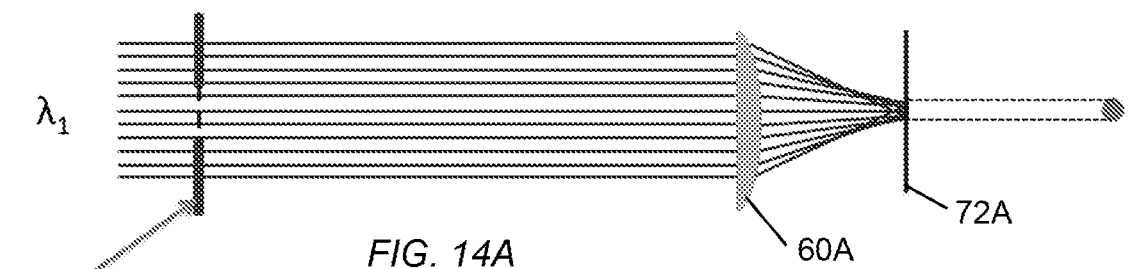
FIGS. 14A and 14B also depict two transmission modes of an optical filter with a focusing lens.
Figure 14B:
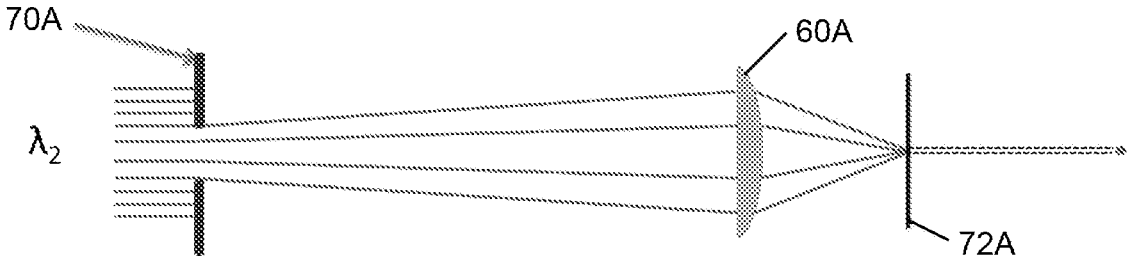

The optical filter 70 in this disclosure has different transmission rates for 405 and 445 nm light, as shown in FIGS. 3A and 3B. FIGS. 13 and 14 show multiple ways of placing the filter 70. FIGS. 13A and 13B depict a first arrangement with two transmission modes of an optical filter 70 with a focusing lens 60 to a focal plane 72. FIGS. 14A and 14B depict a second arrangement with two transmission modes of an optical filter 70A with a focusing lens 60A to a focal plane 72A. As shown in FIGS. 13A and 13B, one arrangement includes placing the filter 70 in close proximity of the lens 60. Diffraction is ignored in this case since the lens 60 and the filter 70 are close. The second arrangement includes placing the lens 60A away from the filter 70A. The 445 nm light still passes the filter 70A and gives a larger spot. The 405 nm light starts to expand after the filter 60A due to diffraction. The lens 70A collects the light and projects the image of the aperture on the focal plane 72A, providing a small laser spot.

In addition to using one filter 70 and two laser wavelengths to achieve two laser spot sizes, multiple filters can be stacked to achieve more than two laser spot sizes. For example, in the FIGS. 15A-15D, three filters 70B, 70C, and 70D are stacked and four wavelengths are used to give four laser spot sizes. Wavelength $\lambda_1$ can pass all three filters and give the largest beam spot. The first filter 70B works as an aperture only for $\lambda_2$ and is transparent to other wavelengths. Wavelength $\lambda_2$ gives the second largest laser spot size. The second filter 70C works as an aperture only for $\lambda_3$ and is transparent to other wavelengths. $\lambda_3$ gives the third largest laser spot size. The third filter 70D works as an aperture only for $\lambda_4$ and is transparent to other wavelengths. $\lambda_4$ gives the smallest laser spot size.

Figure 16A:
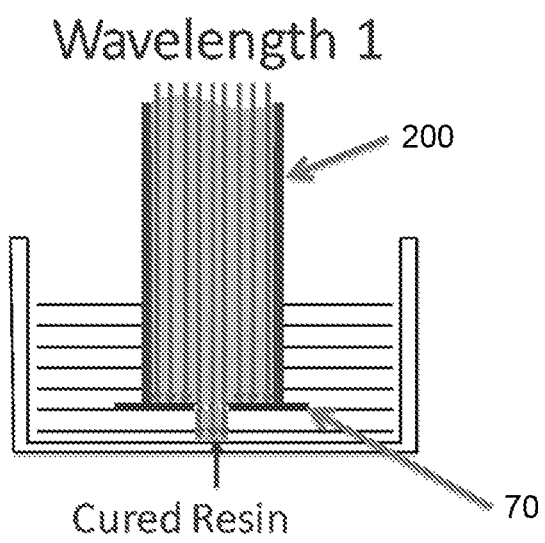
FIGS. 16A and 16B depict two transmission modes of the optical filter with an optical fiber.
Figure 16B:
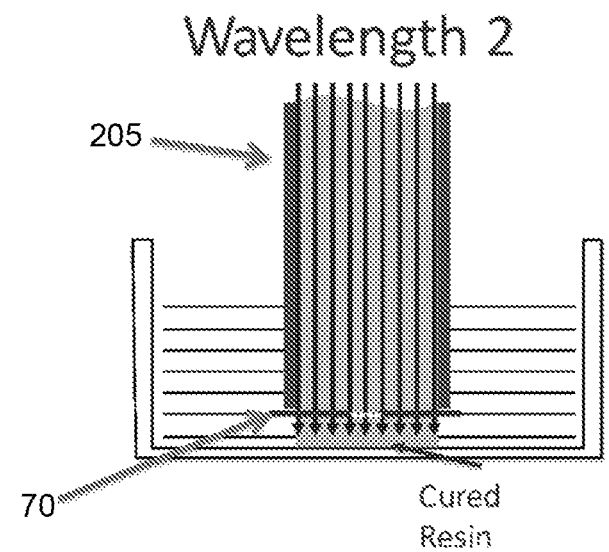

FIGS. 16A and 16B depict two transmission modes of an optical filter 70 on a single CNC accumulation tool having optical fibers 200 and 205 (FIG. 12). For the 445 nm light, most light can pass the filter, which gives a large beam size. For the 405 nm light, incident light on most area of the filter was reflected, and only a beam with a smaller diameter passes. Only part of the filter 70 allows transmission of the 405 nm light. Therefore, the filter works as an aperture. Similarly, the filter 70 can include multiple filters as shown in FIGS. 15A-15D.

The reflection of the 405 nm light is achieved, in one implementation, by high-contrast gratings that have been used in many applications owing to their high reflectance and broad reflection band properties. In addition, the thickness of the high-contrast grating is smaller than that of other reflectors such as dielectric reflector.

Figure 4:
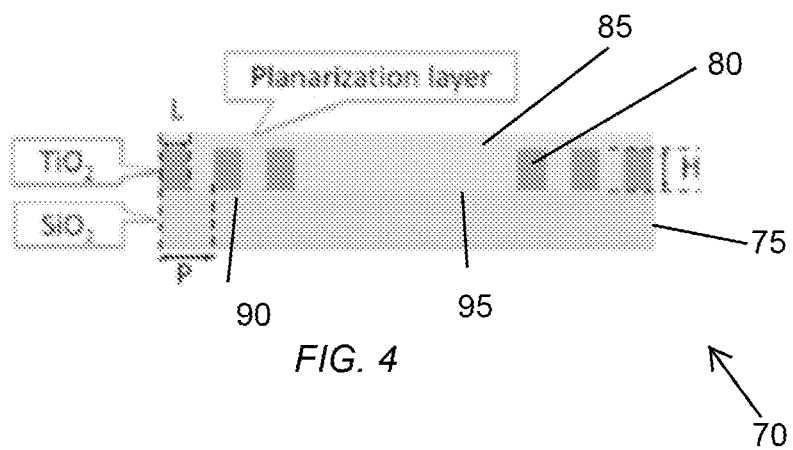
FIG. 4 is a schematic diagram of an exemplary optical filter 70.

The schematic of an optical filter is shown in FIG. 4. The filter 70 includes a bottom quartz layer 75, a $TiO_2$ grating layer 80, and a top planarization layer 85. Gratings 90 at center area 95 are etched off to provide an aperture for the 405 nm light. A period of the gratings is P. Edge length and thickness of the $TiO_2$ grating is L and H, respectively.

The working principle of high-contrast gratings 90 can be described as following: When light is incident on the gratings 90, lateral guided modes are generated, resulting in resonance and reradiation. When the transmitted waves interfere destructively, transmission disappears, and strong reflection occurs. In the area 95 where gratings were etched off, there is no high refractive index contrast. Therefore, no strong reflection would occur. As a result, light can get through this area 95. However, in this area 95, some quartz gratings might be created during the process of etching off $TiO_2$ gratings. Hence, a planarization layer 85 that has similar refractive index as quartz was applied to eliminate undesired resonance. The reflection spectrum can be tuned by adjusting the geometry of the gratings, including P, L, and H in FIG. 4. In this implementation, $TiO_2$ was selected because among all materials with low loss at this wavelength range, $TiO_2$ has the highest refractive index. Since the light sources are polarized, the filter was designed for this specific polarization (TM), and 1D grating design was used.

Figure 5:
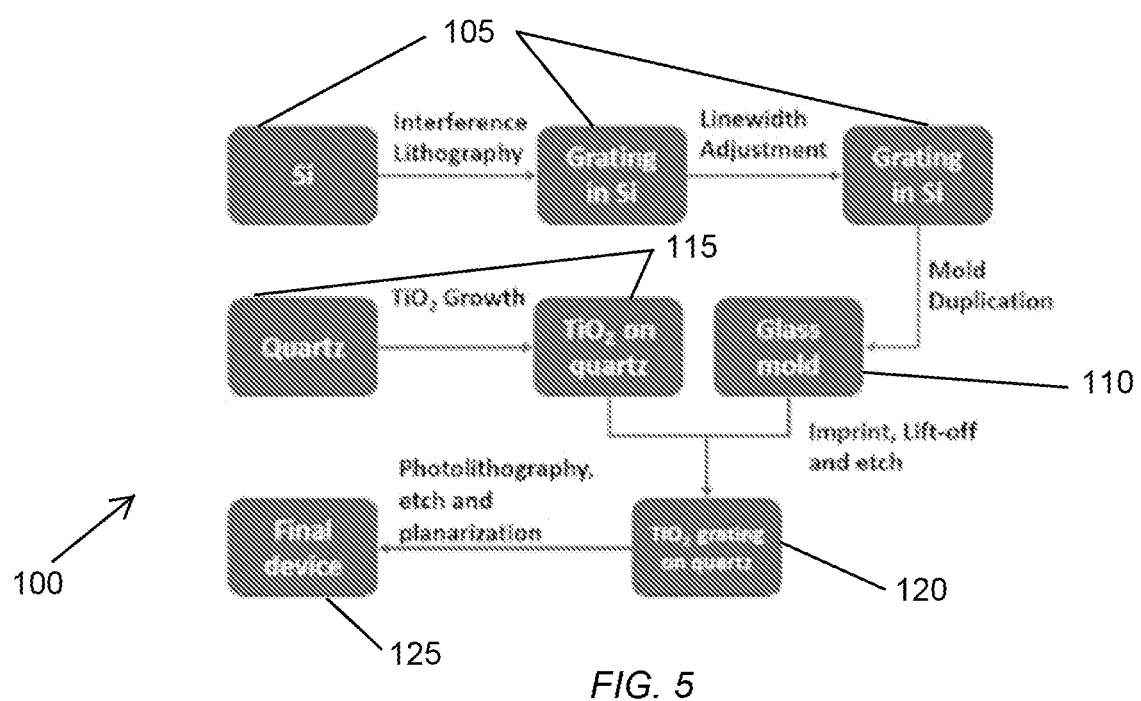
FIG. 5 is a flow chart of a fabrication process.
Figure 6:
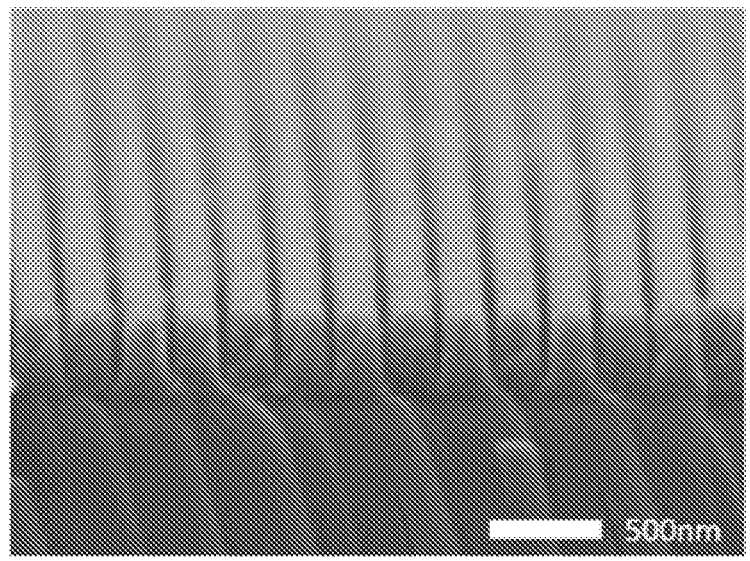
FIG. 6 is a SEM image of $TiO_2$ gratings and quartz substrate.

The fabrication process 100 is summarized in FIG. 5. The gratings 90 were fabricated by using nanoimprint lithography. First (105), a Si mother mold was fabricated by interference lithography. Then, a glass mold (110) was duplicated from the Si mother mold by transferring pattern to a layer of UV-curable resist on a glass substrate. The filter substrate was prepared by deposition of a 400 nm thick $TiO_2$ thin film using direct current magnetron sputtering on top of a quartz substrate (115). The grating pattern was transferred (120) from the glass mold to the $TiO_2$ layer via nanoimprint, lift-off, and RIE etching process. In the lift-off process, 10 nm thick chrome mask was made by electron beam deposition and worked as etching mask in the following RIE etching. An RIE etching recipe that was developed by Liu et al. with a gas combination of $SF_6$, $C_4F_8$ and $O_2$ was used. FIG. 6 shows a SEM image of finished $TiO_2$ gratings.

After $TiO_2$ gratings were fabricated, an additional step 125 of photolithography and RIE etching was carried out to etch away $TiO_2$ gratings in a circular area with a diameter of 96 μm. This area can virtually be any shape depending on the requirement of application. Finally, a planarization layer was applied for aforementioned reason. Two-hundred nanometer thick UV curable resist was spin coated and cured to be the planarization layer.

Transmission of the Filter

Figure 7:
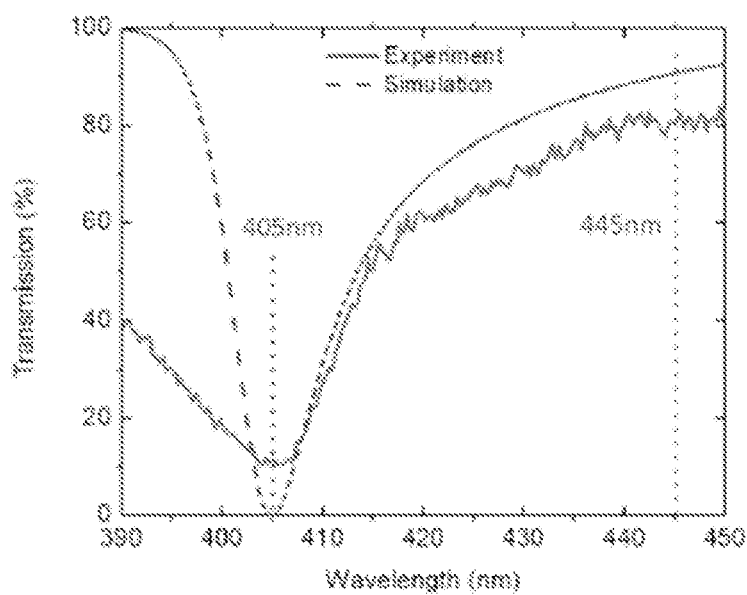
FIG. 7 is a chart of experimental and simulated transmission spectrum of $TiO_2$ gratings.

Optical transmission of the grating area was measured and compared with simulation in FIG. 7. Numerical simulation was performed via finite-difference time-domain (FDTD) method using Lumerical FDTD solutions software. In the spectrum, the measured center wavelength of reflection matches the simulation result very well at 405 nm. Transmission at 405 nm is 10% while at 445 nm is about 80%, which means 405 nm light will be mostly reflected by the gratings while 445 nm light will pass.

Printing Demonstration

Figure 8:
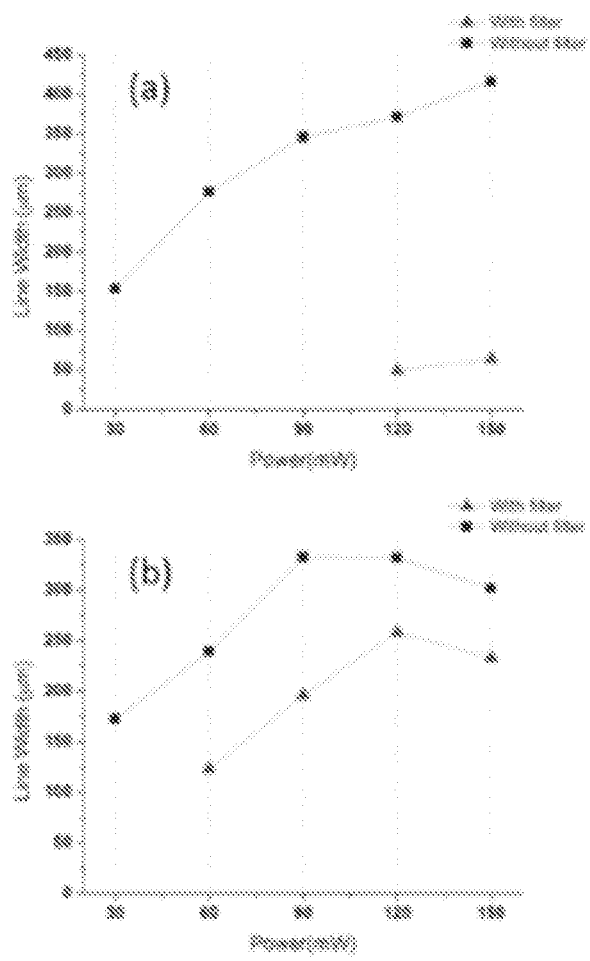
FIG. 8 includes charts of a comparison of the line widths of patterns printed by unfiltered beam and filtered beam: (a) 405 nm laser and (b) 445 nm laser.

The design purpose of the filter is to greatly reduce the spot size of 405 nm laser while keeping the spot size of 445 nm laser similar to the unfiltered one. The values 405 nm and 445 nm are exemplary. Moreover, the filter transmission sizes and transmission rates are exemplary. Four groups of lines were printed to verify this effect. The target surface was a quarter of 4-in. Si wafer coated with 0.4 ml liquid photocurable resin. After patterns were printed, the sample was rinsed by isopropanol to remove uncured liquid resin. Finally, linewidths were characterized by an optical microscope. FIG. 8 compares the linewidths of lines printed by the unfiltered beam and the filtered beam for both the 405 nm laser and the 445 nm laser. The beam spot size of the 405 nm laser was much more reduced than the 445 nm laser. For example, at laser power of 120 mW, spot size of 405 nm light was reduced from 372 to 50 μm while spot size of 445 nm light was only reduced from 332 to 258 μm due to slight reflection and material loss. There is no corresponding data for some power values since the resin cannot be fully cured in such low power. Additionally, the unfiltered beam of power below 30 mW could not print solid pattern, which confirms that small pattern below 100 μm can only be printed with the filter.

Figure 9:
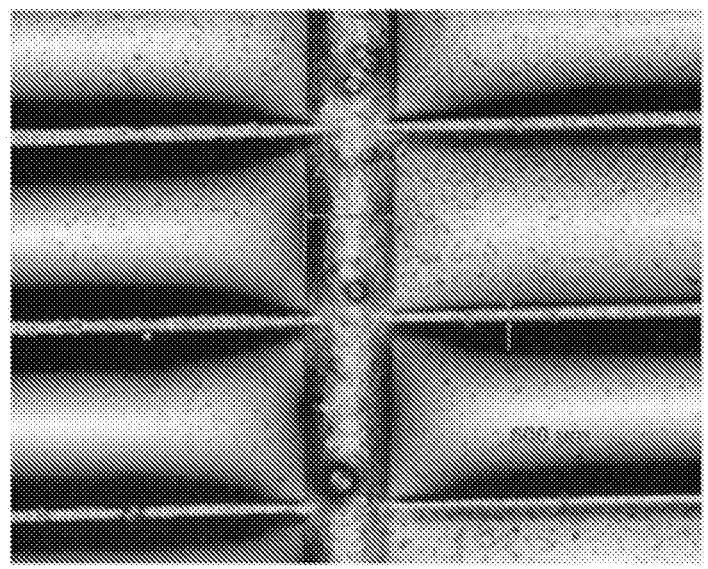
FIG. 9 depicts a printed pattern with both big feature (one vertical line, printed by 445 nm laser) and small feature (three horizontal lines, printed by 405 nm laser).

In order to demonstrate changing pixel size by switching wavelength, a test pattern was printed, which is shown in FIG. 9. FIG. 9 depicts a printed pattern with both big feature (one vertical line, printed by 445 nm laser) and small feature (three horizontal lines, printed by 405 nm laser). Area between the features is the surface of silicon wafer. The microscope was focusing at the top of the features. Black areas are shadows that are on the surface of the wafer and are enlarged due to out of focus. With optical filter installed in the printing system, variable spot size was achieved by only switching wavelength. The optical filter was installed in the stereolithography system during the printing process. The thinner lines (37 lm wide) were first printed by the 405 nm laser. Then, the wavelength of laser was changed to 445 nm to print the thicker lines (272 μm wide).

Efficiency Test Based on Digital Model

Figure 10:
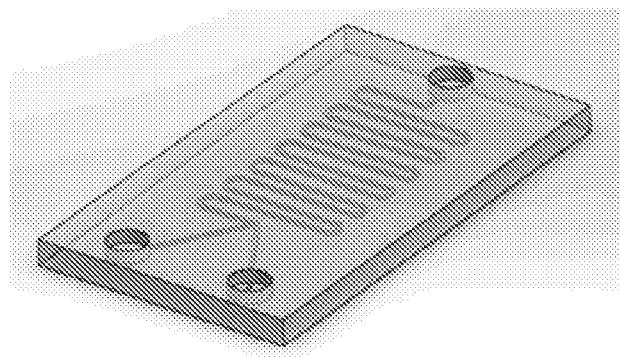
FIG. 10 illustrates a digital model of a microfluidic device.

The purpose of having a variable beam spot is to improve the manufacturing efficiency when the object that is to be built has both small features and large features. To demonstrate the improvement, a digital model of a microfluidic device is created as shown in FIG. 10. The device has an overall dimension of 40 mm (length)×20 mm (width)×2 mm (height). A channel inside the block has a cross-section of 200×200 μm. The beam sizes are taken from the data of 120 mW laser power in FIG. 8. The small spot is 50 μm in diameter from the 405 nm laser, and the large spot is 258 μm in diameter from the 445 nm laser. Variable pixel sizes from 37 to 417 μm have been demonstrated in some embodiments. A maximum spot size can be as large as 700 μm. The distances of travel of the beam spots to build this device are shown in Table 1 (FIG. 11). The distances are calculated using small beam spot only and using small and large beam spots together. The speed of the spots is a constant during real manufacturing process. So, the distance of travel is proportional to manufacturing time. If both of the spots are used, the small spot can build features of the channel, and the large spot can fill other volume in the block. If only one spot can be used, in order to keep the resolution of the channel the same, the small spot will be used to build the whole object. As a result, using the two different beam spots saves 87.6% of manufacturing time, which is a significant improvement.

Discussion

The measured transmission spectrum did not match the simulation result perfectly, but provided effectiveness. Several factors might affect the filter's performance. First, $TiO_2$ has some surface roughness that can be observed from the SEM image. Also, the sidewall profile was not strictly vertical. Additionally, the deposited $TiO_2$ has larger loss than the ideal value used in the simulation, especially in short wavelength range, which was not included in the simulation model.

A high-contrast grating is chosen in this implementation for its small thickness compared with a conventional multilayer coated optical filter. Two wavelengths are used in this implementation for concept demonstration. The filter can be placed at close proximity of the surface of the resin and multiple layers of high-contrast gratings can be integrated into a single filter which can give more beam shapes for multiple wavelengths. In comparison, the conventional filter, if being used in a similar way, will suffer more reduction of resolution in beam shapes due to diffraction of light that travels through thicker material.

Generally, 405 nm laser is able to cure more resin than 445 nm laser at same power level due to higher photon energy. However, when the filter was being used, the 405 nm laser printed thinner lines than the 445 nm laser, which confirms the effectiveness of the filter.

In summary, an optical filter based on high-contrast gratings is designed and fabricated by nanoimprint lithography. The function of cropping 405 nm light beam and transmitting 445 nm light beam is achieved. By using the filter, the minimum printing resolution of the current setup is reduced to 37 μm. Variable beam spot size is realized by exchanging wavelength. This implementation shows a promising way to optimize the manufacturing efficiency of the stereolithography process.

Accordingly, the invention provides new and useful stereolithography apparatus and method of changing light beam size. Various features and advantages of the invention are set forth in the following claims.

What is claimed is:

1. A stereolithography apparatus comprising:
    a light source for providing a first light beam with a first wavelength and a first beam dimension and a second light beam with a second wavelength and a second beam dimension;
    a multi-translucent optical filter in optical communication with the light source, the multi-translucent optical filter allowing the first light beam with the first wavelength to pass through with a third beam dimension and allowing the second light beam with the second wavelength to pass through with a fourth beam dimension substantially different from the third beam dimension, the multi-translucent optical filter including a grating layer having an aperture portion and a grating portion, the aperture portion configured to allow the second light beam to pass through with the fourth beam dimension, the grating portion configured to prevent the second light beam from passing through outside of the fourth beam dimension, the grating layer configured to allow the first light beam to pass through with the third beam dimension substantially similar to the first beam dimension, and
    a liquid tank of photocurable resin, the photocurable resin including a surface upon which the first light beam and the second light beam are to be projected.

2. The stereolithography apparatus of claim 1, further comprising:
    a first dimension mirror;
    a first gyro controlling the first dimension mirror;
    a second dimension mirror;
    a second gyro controlling the second dimension mirror; and
    the first dimension mirror and the second dimension mirror being optically coupled to the multi-translucent optical filter and for optically controlling the first light beam and the second light beam onto a target.

3. The stereolithography apparatus of claim 2, further comprising a focusing lens optically coupled between the multi-translucent optical filter and the two mirrors, and wherein the light source includes a laser source.

4. The stereolithography apparatus of claim 1, wherein the third beam dimension is substantially similar to the first beam dimension.

5. The stereolithography apparatus of claim 1, wherein the first beam dimension and the third beam dimension are a beam diameter of the first light beam, and the second beam dimension and the fourth beam dimension are a beam diameter of the second light beam.

6. The stereolithography apparatus of claim 1, wherein the third beam dimension of the first light beam has a first diameter for the first light beam and the fourth beam dimension of the second light beam has a second diameter for the second light beam, the second diameter being substantially different from the first diameter.

7. The stereolithography apparatus of claim 1, wherein the first beam dimension of the first light beam has a first diameter for the first light beam, wherein the second beam dimension of the second light beam has a second diameter for the second light beam, and wherein the second diameter is substantially similar to the first diameter.

8. The stereolithography apparatus of claim 7, wherein the third beam dimension of the first light beam has a third diameter for the first light beam, wherein the fourth beam dimension of the second light beam has a fourth diameter for the second light beam, and wherein the fourth diameter is substantially different from the third diameter.

9. The stereolithography apparatus of claim 8, wherein the third diameter is substantially similar to the first diameter.

10. The stereolithography apparatus of claim 1, wherein the multi-translucent optical filter further includes a quartz layer and a planarization layer.

11. The stereolithography apparatus of claim 1, wherein the light source includes a first light source for providing the first light beam and further includes a second light source for providing the second light beam.

12. The stereolithography apparatus of claim 11, wherein the first light source includes a light emitting diode and an optical fiber.

13. The stereolithography apparatus of claim 1, wherein the light source further provides a third light beam with a third wavelength, wherein the multi-translucent optical filter includes a plurality of filters, wherein the plurality of filters include a first filter allowing the second light beam with the second wavelength to pass through with the fourth beam dimension, and a second filter allowing the third light beam with the third wavelength to pass through with a fifth beam dimension substantially different from the third beam dimension and the fourth beam dimension, and wherein the first filter and the second filter allow the first light beam with the first wavelength to pass through with the third beam dimension.

14. A method of changing light beam spot size in a stereolithography apparatus, the stereolithography apparatus including a light source, a multi-translucent optical filter in optical communication with the light source, the multi-translucent optical filter including a grating layer having an aperture portion and a grating portion, and a liquid tank of photocurable resin, the photocurable resin including a surface upon which light beams are to be projected, the method comprising:

providing, with the light source, a first light beam with a first wavelength and a first beam dimension;

providing, with the light source, a second light beam with a second wavelength and a second beam dimension;

allowing the first light beam through the multi-translucent optical filter, the allowed light having a third beam dimension, the grating layer allowing the first light beam to pass through with the third beam dimension;

allowing the second light beam through the multi-translucent optical filter, the allowed light having a fourth beam dimension substantially different from the first beam dimension, the aperture portion allowing the second light beam to pass through with the fourth beam dimension, the grating portion preventing the second light beam from passing through outside of the fourth beam dimension;

controlling the first light beam to project onto a target; and controlling the second light beam to project onto the target.

15. The method of claim 14, wherein the third beam dimension is substantially similar to the first beam dimension.

16. The method of claim 14, wherein the first beam dimension and the third beam dimension are a beam diameter of the first light beam, and the second beam dimension and the fourth beam dimension are a beam diameter of the second light beam.

17. The method of claim 14, wherein the third beam dimension of the first light beam has a first diameter for the first light beam and the fourth beam dimension of the second light beam has a second diameter for the second light beam, the second diameter being substantially different from the first diameter.

18. The method of claim 14, wherein the first beam dimension of the first light beam has a first diameter for the first light beam, wherein the second beam dimension of the second light beam has a second diameter for the second light beam, and wherein the second diameter is substantially similar to the first diameter.

19. The method of claim 18, wherein the third beam dimension of the first light beam has a third diameter for the first light beam, wherein the fourth beam dimension of the second light beam has a fourth diameter for the second light beam, and wherein the fourth diameter is substantially different from the third diameter.

20. The method of claim 19, wherein the third diameter is substantially similar to the first diameter.

* * * * *